United States Patent [19]

Rhodes

[11] 4,229,803
[45] Oct. 21, 1980

[54] I²L FULL ADDER AND ALU

[75] Inventor: Clifford C. Rhodes, Stafford, Tex.

[73] Assignee: Texas Instruments Incorporated, Dallas, Tex.

[21] Appl. No.: 911,845

[22] Filed: Jun. 2, 1978

[51] Int. Cl.² ............................................. G06F 7/50
[52] U.S. Cl. .................................... 364/787; 364/716
[58] Field of Search .............. 364/787, 786, 785, 784, 364/716

[56] References Cited

U.S. PATENT DOCUMENTS

| 3,317,721 | 5/1967 | Berlind | 364/784 |
| 3,728,532 | 4/1973 | Pryor | 364/787 |
| 3,805,045 | 4/1974 | Larsen | 364/787 |
| 3,925,651 | 12/1975 | Miller | 364/787 X |
| 3,993,891 | 11/1976 | Beck et al. | 364/787 |

Primary Examiner—David H. Malzahn
Attorney, Agent, or Firm—Melvin S. Sharp; Richard L. Donaldson; Jeffrey V. Myers

[57] ABSTRACT

A minimum design I²L full adder with carry look ahead capabilities has all arithmetic logic unit functions, including OR, AND, XOR and SUM generated within. The full adder is easily extended to an arithmetic logic unit where all logic functions are selected at the output.

4 Claims, 3 Drawing Figures

I²L FULL ADDER AND ALU

FIELD OF THE INVENTION

This invention relates to an I²L multilogic circuit, and more particularly, to an I²L full adder having carry look ahead capabilities that is expanded to an arithmetic logic unit having output logic and arithmetic select.

DESCRIPTION OF THE PRIOR ART

An essential function of LSI circuit implementation is addition. In order to optimize bar size, and hence, yield and profitability, denser functions must be achieved. Logic using I²L technology has shown three directions. One approach being a direct translation of existing TTL logic into I²L implementation. This approach yields a fast but inefficient adder, a result which is due to fan out problems in I²L, that is a separate collector required for each signal. Threshold logic has been considered for I²L implementation. Such threshold logic has not been proven and cannot be expanded for carry look ahead capabilities and arithmetic logic functions. Circuits employing these two techniques may be found in "Threshold I²L and Its Application To Binary Symetric Functions In Multivalued Logic" Volume SC-12, No. 5, October 1977. A last approach uses an all AND circuit implementation which is translated into I²L. This technique also ignores fanout hazards in I²L and as a result is inefficient.

In adding together two binary numbers of multiple bits it is required that the carry out from the addition of a first pair of binary numbers be processed as a carry in bit for the addition of a subsequent pair of binary numbers. The effect of such an operation is the addition of the binary pairs of numbers in a serial manner. Serial addition in this manner is relatively slow in comparison to a parallel approach. The parallel approach provided in the present invention employs a carry look ahead implementation to determine the carry-out bit while adding the pairs of binary numbers together. This allows for the parallel addition of all binary pairs of numbers as the carry-in bit has been predetermined for all stages.

Arithmetic logic units implemented with I²L and other technologies have been fabricated using input selection techniques. The desired logic function is selected at the input of the ALU allowing the logic function to be generated within the ALU and then exited by output circuitry. This approach has a built in time delay between the selection of the logic function and its output depending upon the number of gates required to generate the appropriate logic function. By developing all ALU functions in the normal full adder, then selecting the required function at the output, this allows more time in a system for PLA select lines to set up, since this set up is now in parallel with the add function. This provides all logic functions at the output without a time delay between selection and output.

Accordingly, an object of the present invention is to provide a multilogic circuit implementable with I²L technology.

Another object of the present invention is to provide a multilogic circuit using I²L technology having carry look ahead.

Yet another object of the present invention is to provide a multilogic circuit using I²L technology incorporating carry look ahead and having all necessary arithmetic logic functions, in particular, OR, AND, XOR, and SUM.

Yet still another object of the present invention is to provide an I²L arithmetic logic unit whose logic functions are generated in the adder with no additional gating required and where the ALU function is selected at the output.

SUMMARY OF THE INVENTION

The circuit of the present invention is an I²L full adder designed to allow for incorporation of a carry look ahead scheme and to yield all necessary arithmetic logic functions required comprising OR, AND, XOR and SUM. The adder is easily expanded to an arithmetic logic unit where all logic functions are selected at the output allowing for parallel operation. The I²L full adder requires 11 gates and 18 collectors. For the arithmetic logic unit implementation additional gating is required at the input to provide complement data and at the output to provide function selection. Maximum delay to output is five gate delays, one delay more than a direct implementation. This extra delay, however, is lost in the carry look ahead adder of several bits. For the carry look ahead adder and ALU as disclosed, a propagate term $(A+B)$ and generate term $(A \cdot B)$ are required. These terms are easily implemented by adding collectors to the existing gates of the I²L full adder and ALU of the present invention.

A pair of binary numbers are entered into the full adder by way of a first and second digital data input circuit. The first input circuit has a first and a second output. The second circuit has a first and second output where the first outputs are connected to a common communication line to provide NOR logic. An inverting circuit is provided having an input for each of the second outputs and a common output providing AND logic. A logic circuit has a respective input for the common communication line and the common output. The logic circuit has a first and a second plurality of outputs connected to a corresponding two of the second plurality of outputs. The connected outputs of the first plurality provide XOR logic and the unconnected outputs of the first plurality provide a generate term and the second plurality a propagate term. Carry-in digital data is entered by appropriate circuitry having an inverted or complement output connected to one of the connected plurality and a non-inverted output. An output circuit having a first input connected to one of the connector plurality, a second input connected to the non-invert output and a third input connected to the other one of the connected plurality is provided to exit the arithmetic SUM of the full adder.

The propagate term, the generate term and the carry-out term are fed to the appropriate circuitry to generate the appropriate carry-in bit for the carry look ahead scheme. The full adder with carry look ahead capability is expanded to an arithmetic logic unit by adding the appropriate gating required at the input to provide complement data select and the appropriate output circuitry to provide the function selection.

BRIEF DESCRIPTION OF THE DRAWINGS

The invention, together with its various features and advantages, can be easily understood from the following, more detailed description taken in conjunction with the accompanying drawings in which.

DETAILED DESCRIPTION OF THE INVENTION

The full adder and arithmetic logic unit circuitry of the present invention is implementable with any I²L technology. Such technology is described in U.S. Pat. No. 3,736,477 issued to Berger et al.

Figure 1:
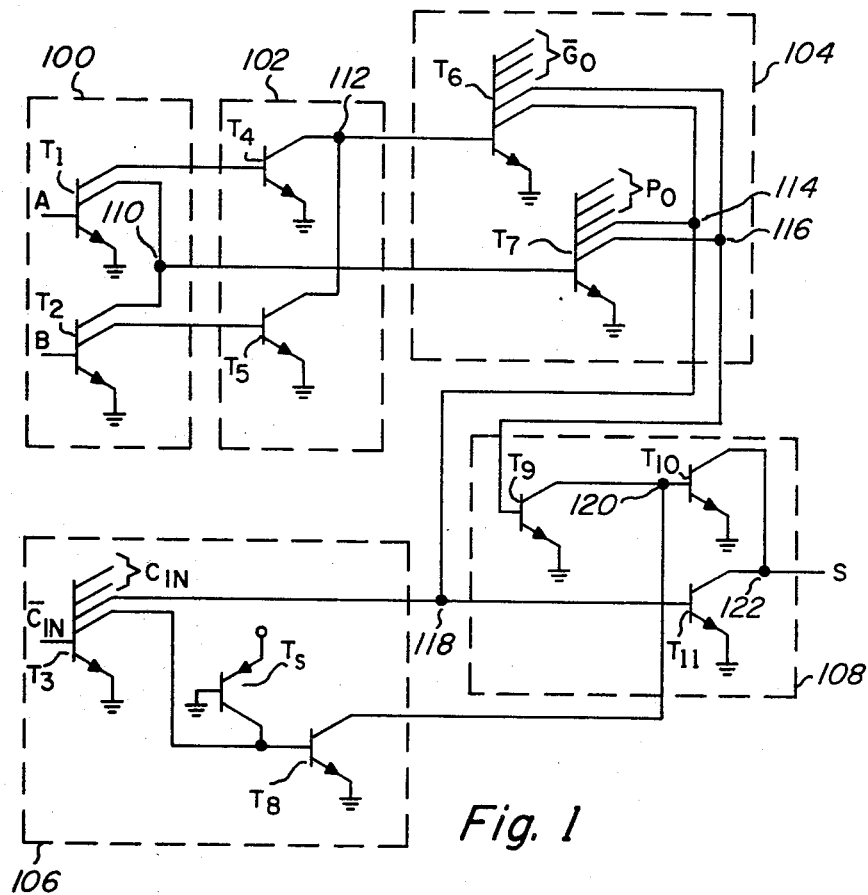
FIG. 1 is a circuit diagram which shows an I²L full adder embodiment having carry look ahead capabilities according to this invention.

In FIG. 1 an embodiment of the present invention comprising an I²L full adder with carry look ahead capabilities is illustrated. The full adder circuitry accepts three binary digit data inputs, two digits to be added plus a carry digit from a previous stage, and gives an output equal to their sum. The two digits to be added together are indicated by A and B and the carry-in digit by $C_{in}$. The output or sum is indicated by S. The output sum and the carry-out binary bit $C_{out}$ for the various combinations of inputs are illustrated in truth Table I.

TABLE I

FULL ADDER TRUTH TABLE

| $\overline{C_{in}}$ | B | A | $\overline{C_{out}}$ | S |
|---|---|---|---|---|
| 1 | 0 | 0 | 1 | 0 |
| 1 | 0 | 1 | 1 | 1 |
| 1 | 1 | 0 | 1 | 1 |
| 1 | 1 | 1 | 0 | 0 |
| 0 | 0 | 0 | 1 | 1 |
| 0 | 0 | 1 | 0 | 0 |
| 0 | 1 | 0 | 0 | 0 |
| 0 | 1 | 1 | 0 | 1 |

The binary data A and B are entered into the full adder circuitry by means of input circuit 100. The binary data A is entered by means of transistor T1 and binary data B by means of transistor T2. The data is applied to the respective bases of each of these transistors. Each of the transistors T1 and T2 have a plurality of outputs comprising collectors. In the embodiment illustrated two collectors for each transistor are provided. These collectors provide inverted or complement outputs of the inputted data. A collector from transistor T1 and transistor T2 are connected together to a common communication line at node 110 to provide NOR logic.

An inverting circuitry 102 is comprised of two transistors T4 and T5. The base of transistor T4 is connected to an output of transistor T1. The complement of the input data term A is applied to the base of transistor T4. In a like manner the base of transistor T5 is connected to the collector of transistor T2. The complement of binary data B is applied to the base of transistor T5. The collectors of transistor T4 and T5 are connected together to a common output at node 112 thereby generating AND logic. The output on the collectors of transistors T4 and T5 have the same value as the entering data A and B as applied to the bases of transistor T1 and T2.

Logic circuit 104 is comprised of two transistors T6 and T7. Each of these transistors have a plurality of collector outputs. The base of transistor T6 is connected to the common output node 112 of the inverting circuit 102 to receive the AND logic. The base of transistor T7 receives the NOR logic from the common communication line at node 110 of the input circuitry 100. Two collectors from transistor T6 are connected to two collectors of transistor T7 thereby providing two XOR logic outputs at nodes 114 and 116. The remaining collectors of transistor T6 provide the complement of a generate term ($\overline{A \cdot B}$) and the remaining collectors of transistors T7 provide a propagate term (A+B) which are used to determine the carry-in bit for the higher order full adder stages.

Input circuitry 106 is provided for the carry-in bit $C_{in}$ from a prior stage of a multibit adder circuit. The input circuitry for the carry-in bit is comprised of two transistors T3 and T8. The carry-in bit is applied to the base of transistor T3 which has a plurality of collector outputs. One collector is connected to the base of transistor T8 which provides an output equal to the carry-in bit comprising non-inverted output. One collector of transistor T3 is connected to the connected collectors of the logic circuitry 104 at node 118. The remaining collectors of transistors T3 provide a carry-out bit $C_o$ to be used in calculating the carry-in bit for the next stages of the full adder.

Output circuitry for providing the sum S of the addition of the three binary digital data is provided by circuitry 108 comprised of three transistors T9, T10 and T11. The base of transistor T9 is connected to node 116 from the connection of the collectors of the logic circuitry 104. This applies an XOR logic function to the base of transistor T9. The collector of transistor T9 is connected to the base of transistor T10. The output from the collector of transistor T8 is connected between the base of transistor T10 and the collector of transistor T9 at node 120. The collector from transistor T3 of the carry input circuitry 106 that is connected to node 118 is connected to the base of transistor T11. A collector from transistor T11 is connected at node 122 which in turn is connected to the collector of transistor T10. Node 122 is the output node for the arithmetic SUM of the multibit adder circuitry.

The logic functions generated at each node of the full adder circuitry including the propagate and generate terms are indicated in Table II. It is seen that the logic functions OR, AND and XOR, and arithmetic SUM are all generated within the full adder circuitry.

TABLE II

| NODE | LOGIC FUNCTION |
|---|---|
| 110 | $\overline{A + B}$ |
| 112 | A · B |
| 114 | (A + B) · $C_{in}$ |
| 116 | A + B |
| 118 | $C_{in}$ · A + B |
| 120 | $\overline{C_{in} \cdot A + B}$ |
| 122 | S |
| $\overline{G_o}$ | $\overline{A \cdot B}$ |
| $P_o$ | A + B |

The transistors illustrated in the logic circuits of the present invention may be fabricated by techniques known to one skilled in the art such as NPN or PNP transistors. The emitters of the transistors illustrated are all connected to a source of low potential such as ground. Each of the transistors have an injection transistor connected to the base of each switching transistor as required to fabricate the I²L logic circuits as known to one skilled in the art. One such current source transistor is illustrated as transistor $T_s$ which is connected to the base of transistor T8.

Figure 2:
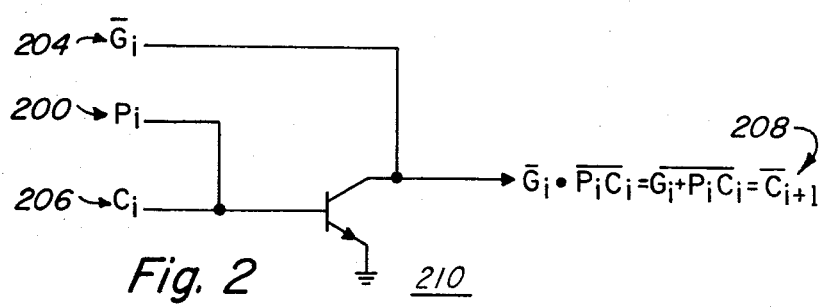
FIG. 2 is a circuit diagram showing the generation of the carry bit from the input data of the carry-out term, propagate term and generate term.

The full adder circuitry of FIG. 1 provides the necessary terms consisting of the propagate term, the generate term and the carry-in term to determine the carry-out bit. As described, the generate term is provided at the collector of transistor T6, the propagate term at the collector of T7 and the carry bit at the collector of transistor T3. By using boolean algebra techniques known to those skilled in the art the carry-out bit from the full adder may be predetermined. The carry-out bit may be determined from the following equation:

$$C_{i+1} = (A_i \cdot B_i) + (A_i + B_i)C_i$$

where $G_i = (A_i \cdot B_i)$, and
where $P_i = (A_i + B_i)$,
therefore $C_{i+1} = G_i + (P_i C_i)$ In FIG. 2a circuit diagram of conventional circuitry known to those skilled in the art is illustrated to calculate the carry-out bit. The propagate term 210, the complement of the generate term 204 and the carry-in bit 206 are entered into circuitry 200 where the desired calculation is performed according to the above equation to provide the carry-out bit at 208.

Figure 3:
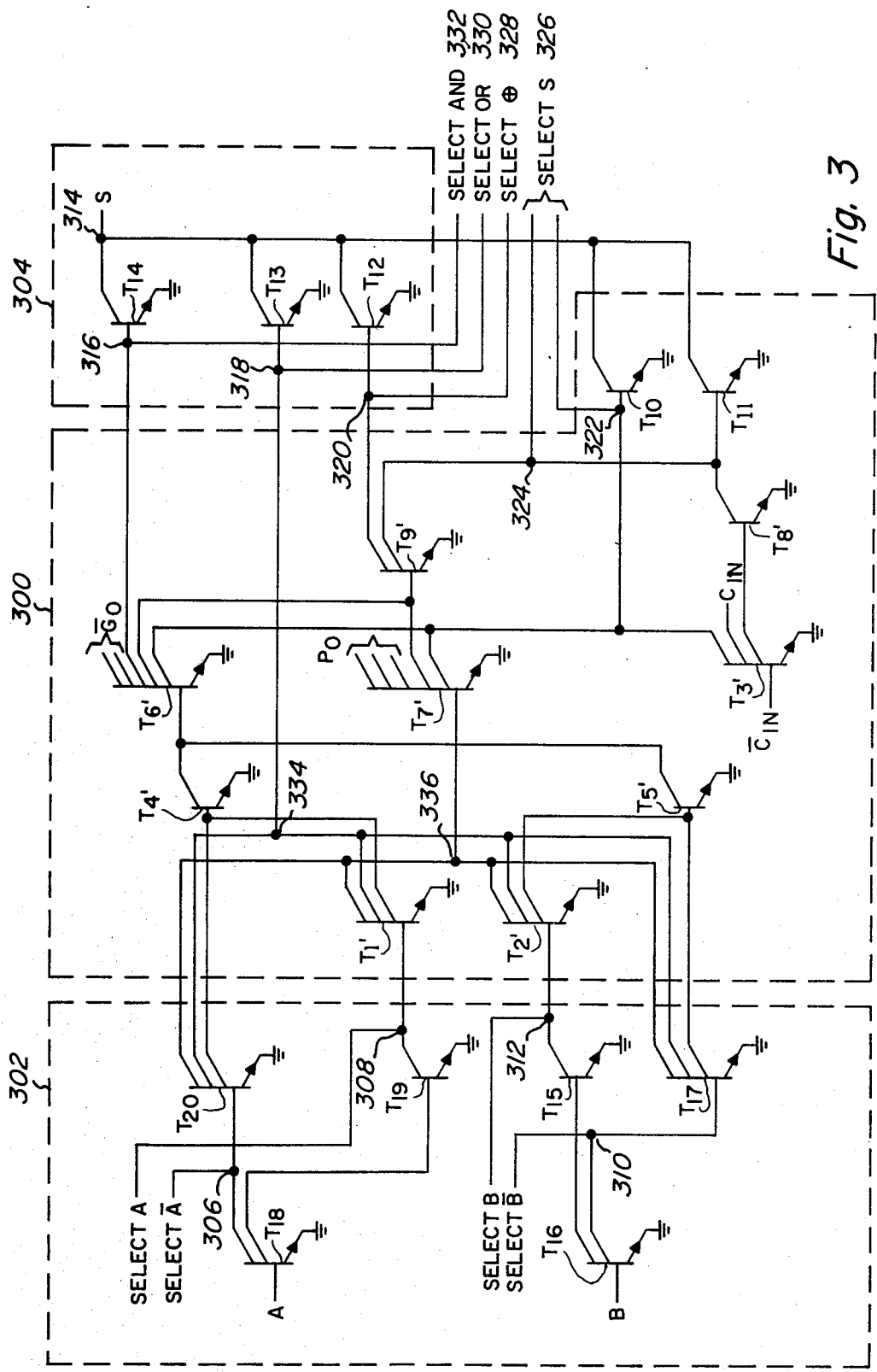
FIG. 3 is a circuit diagram which shows an arithmetic logic unit utilizing a I²L full adder having carry look ahead capabilities and having output selection of the logic functions according to this invention.

The I²L full adder with carry look ahead capabilities illustrated in FIG. 1 may be extended to an arithmetic logic unit where all logic functions are selected at the output as illustrated in FIG. 3. The arithmetic logic unit utilizes an I²L full adder circuitry 300 having carry look ahead which was previously described with reference to FIG. 1. Input select circuitry 302 is provided for the selection of the binary data A and B and their complements. The select circuitry is comprised of four transistors T15, T16, T18 and T19. Binary data A is inputted at the base of transistor T18. The transistor T18 has two collectors to provide two complement outputs one of which is connected to the base of transistor T19. Select lines are attached at nodes 306 for complement data selection and to node 310 for the original data selection. Node 308 is tied to the collector of transistor T1'. This circuit provides for the selection of the binary data A and its complement to be entered into the I²L full adder circuitry 300.

In a like manner, binary data B is entered into the base of transistor T16 having one collector tied to the base of transistor of T15 and one collector tied to node 310. The complement data is selected at node 312 and a noncomplement data selected at node 310. Two additional transistors T17 and T20 are provided to receive the complement data in the same manner as receiving transistors T1' and T2'. Each of the input or receiving transistors T17 and T20 have three collectors. The input or receiving transistors T1' and T2' of the full adder circuitry as disclosed in FIG. 1 have two collectors where in the ALU of FIG. 3 three collectors are provided. Two pairs of collectors from each of the four input transistors T1', T2', T17 and T20 are respectively connected in parallel. The binary data is entered into the full adder circuitry by means of transistor T1', T2', T20 and T17. A common communication line from each of the parallel connected collectors provide NOR logic. One output from node 334 is connected to the base of T13 and the other from node 336 is connected to the base of T7'.

Output select circuitry is provided to select the desired arithmetic logic unit function. As previously described, the arithmetic logic functions are generated within the full adder circuitry 300. The output logic select circuitry is comprised of three transistors T12, T13 and T14. The output transistors as illustrated have their collectors tied in parallel with the collectors of transistors T10' and T11' which comprises the arithmetic sum output circuitry. The base of transistor T14 is connected to the collector of transistor T6', the base of transistor T13 is tied to the collectors of the input transistors T1', T2', T17 and T20 and the base of transistor T12 is connected to the collector of transistor T9'. The logic and sum output is exited at the connections of the collectors of the output circuitry at node 314.

In operation of the ALU, selection is made of either the binary data or its complement value by selecting one of the select lines at node 306, 308, 310 or 312. The arithmetic logic functions of OR, AND, XOR and SUM are generated within the full adder circuitry 300. The particular arithmetic logic function desired is obtained by the appropriate output select line 326, 328, 330 and 332.

The AND logic function is selected at node 316 which is connected to the collector of transistor T6'. The AND function then gated through transistor T14 to the output node 314. In a similar manner the logic function OR is selected at node 318 which is connected to the common collectors of the receiving transistors and gated through transistor T16 to the output node. The XOR logic function is selected at node 320 which is connected to the collector of transistor T9' and gated to the base of transistor T12 which otuputs to node 314. The arithmetic SUM must be selected at node 322 and node 324. Node 322 is connected to the collector of transistor T3' and is connected to the base of transistor T10' which outputs to node 314. In addition, node 324 is connected to the collector of transistor T8' and to the base of transistor T11' which outputs to node 314.

While particular embodiments of this invention have been disclosed herein, it will be understood that various modifications may become apparent to those skilled in the art without departing from the spirit and scope of the invention which is defined by the appended claims.

What is claimed is:

1. A full adder comprising:
    data input means for receiving first and second binary data bits, and for providing the logical complements of the received first and second data bits;
    carry input means for receiving the logical complement of a binary carry-in bit, and for providing the logical complement of the received complement, the result being the carry-in bit;
    NOR logic means connected to the data input means, the NOR logic means receiving the complements of the first and second data bits, and providing the logical AND of the received complements, the result being the logical NOR of the first and second data bits;
    first inverter means connected to the data input means, the first inverter means receiving the complements of the first and second data bits, and providing the logical complement of the received complements, the result being the first and second data bits;
    AND logic means connected to the first inverter means, the AND logic means receiving the first and second data bits, and providing the logical AND of the received first and second data bits;

second inverter means connected to the AND logic means, the second inverter means receiving the logical AND of the first and second data bits, and providing the logical complement of the received logical AND, the result being the logical NAND of the first and second data bits;

third inverter means connected to the NOR logic means, the third inverter means receiving the logical NOR of the first and second data bits, and providing the logical complement of the received logical NOR, the result being the logical OR of the first and second data bits;

XOR logic means connected to the second and the third inverter means, the XOR logic means receiving the logical NAND and the logical OR of the first and second data bits, and providing the logical AND of the received logical NAND and logical OR of the first and second data bits, the result being the logical XOR of the first and second data bits;

first intermediate logic means connected to the carry input means and to the XOR logic means, the first intermediate logic means receiving the carry-in bit and the logical XOR of the first and second data bits, and providing the logical AND of the received carry-in bit and logical XOR;

fourth inverter means connected to the carry input means, the fourth inverter means receiving the carry-in bit, and providing the logical complement of the received carry-in bit;

fifth inverter means connected to the XOR logic means, the fifth inverter means receiving the logical XOR of the first and second data bits, and providing the logical complement of the received logical XOR;

second intermediate logic means connected to the fourth and fifth inverter means, the second intermediate logic means receiving the logical complements of the carry-in bit and of the logical XOR, and providing the logical AND of the received logical complements;

sum logic means connected to the first and second intermediate logic means, the sum logic means receiving the logical AND provided by each of the first and second intermediate logic means, determining the logical complement of each received logical AND, and providing the logical AND of the resultant logical complements, the result being the logical sum of the first and second data bits; and carry output means connected to the carry input means and to the second and third inverter means, the carry output means receiving the carry-in bit and the logical NAND and the logical OR of the first and second data bits, determining the logical NAND of the received carry-in bit and logical OR, and providing the logical AND of the received logical NAND and the determined logical NAND, the result being the carry-out bit from the arithmetic sum of the first and second data bits and the carry-in bit.

2. The full adder of claim 1 characterized as an arithmetic logic unit, and further comprising:

select gating means connected to the second inverter means, to the NOR logic means, to the XOR logic means, and to the sum logic means, the select gating means providing a selected one of the logical AND, the logical OR, the logical XOR, and the arithmetic sum of the first and second data bits.

3. A full adder comprising:

input means for receiving first and second data bits and a carry-in bit, and for providing the received first and second data bits and the carry-in bit, and the logical complements thereof;

first logic means for receiving the first and second data bits, and for providing the logical AND and NAND of the received first and second data bits;

second logic means for receiving the complements of the first and second data bits, and for providing the logical OR and NOR of the received first and second data bits;

third logic means for receiving the logical NAND and the logical OR, and for providing the logical AND and the logical NAND of the received logical NAND and logical OR, the results being the logical XOR of the first and second data bits, and the complement of the logical XOR, respectively;

sum logic means for receiving the carry-in bit and the complement thereof, and the logical XOR and the complement thereof, for determining the logical NAND of the received carry-in bit and logical XOR, for determining the logical NAND of the received complements of the carry-in bit and logical XOR, and for providing the logical AND of both logical NANDs determined thereby, the result being the arithmetic sum of the first and second data bits; and carry output means for receiving the carry-in bit and the logical NAND and logical OR of the first and second data bits, for determining the logical NAND of the received carry-in bit and the received logical OR, and for providing the logical AND of the received logical NAND and the logical NAND determined thereby, the result being the carry-out bit from the arithmetic sum of the first and second data bits and the carry-in bit.

4. The full adder of claim 3 characterized as an arithmetic logic unit, and further comprising;

select gating means for providing a selected one of the logical functions provided by the first, the second, the third, and the sum logic means.

* * * * *